United States Patent
Narasimha et al.

(10) Patent No.: US 8,504,039 B2
(45) Date of Patent: Aug. 6, 2013

(54) EFFICIENT RESELECTIONS IN THE PRESENCE OF CLOSED SUBSCRIBER GROUP CELLS

(75) Inventors: Murali Narasimha, Lake Zurich, IL (US); Sandeep H Krishnamurthy, Arlington Heights, IL (US); Ravi Kuchibhotla, Gurnee, IL (US)

(73) Assignee: Motorola Mobility LLC, Libertyville, IL (US)

( * ) Notice: Subject to any disclaimer, the term of this patent is extended or adjusted under 35 U.S.C. 154(b) by 617 days.

(21) Appl. No.: 12/605,759

(22) Filed: Oct. 26, 2009

(65) Prior Publication Data

US 2010/0113026 A1  May 6, 2010

Related U.S. Application Data

(60) Provisional application No. 61/111,257, filed on Nov. 4, 2008.

(51) Int. Cl.
*H04W 36/00* (2009.01)
*H04W 4/00* (2009.01)
*H04B 1/00* (2006.01)
*H04B 17/00* (2006.01)
*H04B 1/04* (2006.01)
*H04L 1/00* (2006.01)

(52) U.S. Cl.
USPC ....... 455/436; 455/63.1; 455/67.11; 455/444; 455/114.2; 455/434; 370/252

(58) Field of Classification Search .......... 455/436, 455/63.1, 67.11, 444
See application file for complete search history.

(56) References Cited

U.S. PATENT DOCUMENTS

| 2008/0004025 | A1* | 1/2008 | Lee | 455/437 |
| 2009/0081970 | A1* | 3/2009 | Yavuz et al. | 455/114.2 |
| 2009/0104905 | A1* | 4/2009 | DiGirolamo et al. | 455/434 |
| 2010/0074130 | A1* | 3/2010 | Bertrand et al. | 370/252 |
| 2010/0172254 | A1* | 7/2010 | Sachs | 370/252 |
| 2010/0222055 | A1* | 9/2010 | Cho et al. | 455/434 |

OTHER PUBLICATIONS

3GPP TSG RAN WG4#48bis; Sep. 29-Oct. 3, 2008; Edinburgh, UK; LS on Reselection Handling Towards Non-Allowed CSG Cell; R4-082656.
3GPP TSG RAN WG2#63; Aug. 18-22, Jeju, Korea; LS on Reselection Handling Towards Non-Allowed CSG Cell; R2-084891.
3GPP TSG RAN WG2 Meeting #63; Jeju, Korea, Aug. 18-22, 2008; Way Forward for Remaining Idle Mode Issue to HeNB; R2-083840.
3GPP TSG RAN WG2 Meeting #63bis; Prague, Czech Republich, Oct. 18-22, 2008; Report of 3GPP TSG RAN WG2 meeting #63, Jeju, Korea, Aug. 18-22, 2008; R2-085971.
3GPP TSG RAN WG4 #48bis; Sep. 29-Oct. 3, 2008; Discussion of Reselection Handling Towards Non-Allowed CSG Cell (Response to Incoming LS R2-084891); R4-082384.

(Continued)

*Primary Examiner* — Timothy Pham

(57) ABSTRACT

A mobile station and a method therein for avoiding interference to restricted access cells, including detecting presence of a restricted access cell, determining that a measured path-loss is larger than a path-loss threshold, determining that the mobile station is not allowed to access the restricted access cell, and barring a carrier frequency on which the restricted access cell is deployed when the measured path-loss is larger than the path-loss threshold and when the mobile station is not allowed access to the restricted access cell.

9 Claims, 2 Drawing Sheets

OTHER PUBLICATIONS

RAN WG2: "LS on reselection handling towards non-allowed CSG cell", 3GPP DRAFT; R4-082532, 3rd Generation Partnership Project (3GPP), Mobile Competence Centre; 650, Route Des Lucioles; F-06921 Sophia-Antipolis Cedex; France, no. Scotland, Sep. 24, 2008, all pages.

Rapporteur (Huawei): "Email report on Home-(e)NB mobility, main issues [63_LTE_c01]", 3GPP Draft; R2-085705, 3rd Generation Partnership Project (3GPP), Mobile Competence Centre; 650, Route Des Lucioles; F-06921 Sophia-Antipolis Cedex; France, no. Prague, Czech Republic; Oct. 1, 2008, all pages.

Poort, Ingrid: "The International Search Report and The Written Opinion of the International Searching Authority", European Patent Office, Rijswijk, completed: Jul. 15, 2010, mailed: Jul. 30, 2010, all pages.

* cited by examiner

EFFICIENT RESELECTIONS IN THE PRESENCE OF CLOSED SUBSCRIBER GROUP CELLS

CROSS REFERENCE TO RELATED APPLICATIONS

The present application is related to co-pending U.S. Application No. 61/111,257 filed on 4 Nov. 2008, the contents of which are hereby incorporated by reference and from which benefits are claimed under 35 U.S.C. 119.

FIELD OF DISCLOSURE

The present disclosure relates generally to wireless communications and, more particularly, to reselection in the presence of closed subscriber group cells.

BACKGROUND

Closed Subscriber Group (CSG) cells are used to provide service to small numbers of users. For example, a "home NodeB" can have a small coverage area and provide access only to members of the home NodeB. CSG cells are used to provide better service to the user, e.g., higher data rates, and extend coverage of the operator's network. 3GPP is currently defining the detailed behavior of CSG cells and user equipment (UE) in the presence of CSG cells.

CSG cells can be deployed within the coverage area of conventional macro cells and on the same frequency as the macro cells (mixed carrier). Unlike the deployment of the macro cells, detailed radio frequency (RF) planning is not done for typical CSG cell deployments. Typically, a user installs a CSG cell at a home or office. Given that a CSG cell bars access to all except a small specific set of UEs, it is possible to have UEs close to the CSG cell that are not allowed access to the CSG cell. Such UEs will normally be served by the macro cell. Uplink (UL) transmissions from such macro cell UEs interfere with the UL transmissions of UEs in the CSG cell. This can cause service degradation for the UEs in the CSG cell. Such degradation may be characterized by dropped calls, lowered data throughput, etc. The interference can also result in a higher noise floor in the CSG cell, causing the CSG cell UEs to increase their transmit power in an effort to overcome the interference, which in turn interferes with the UL transmission of the macro cell UEs, causing the macro cell UEs to increase their transmit power to overcome the interference, and so on.

3GPP RAN2 and RAN4 working groups have investigated the foregoing problem and considered an approach to avoid or reduce the interference According the proposed solution, a macro cell UE that can potentially cause interference to the UL transmissions of CSG cell UEs would be required to bar the frequency and reselect to a different frequency or to a different Radio Access Technology (RAT). The 3GPP RAN2 and RAN4 working groups have further discussed how this objective can be accomplished for UEs in idle mode. In idle mode, a UE is generally expected to camp on the "best cell", i.e., the cell that is ranked highest in its reselection ranking. The UE therefore reads system information only from the highest ranked cell. If the highest ranked cell is not suitable to the UE, the UE bars the frequency (i.e., all cells on the frequency) for a specified duration.

With the above behavior, in the situation where a UE is near a CSG cell (i.e., the CSG cell is the highest ranked) that the UE is not allowed to access, the UE must reselect to a different frequency. This leads however to unnecessary reselections by the UE. The following method has been proposed for controlling UE reselections: An Intra-frequency reselection indication (IFRI) is transmitted by every CSG cell in its system information message. This indication can be "allowed" or "disallowed". If an idle mode UE finds a CSG cell to be the highest ranked cell, it reads the IFRI from the system information. If the IFRI is set to "disallowed", the UE bars the frequency; this behavior is same as when highest ranked cell is not suitable. If the IFRI is set to "allowed", the UE camps on the second highest ranked cell (the macro cell).

The above solution to reducing UE reselections can have a substantial battery life impact on a UE as it requires the UE to read system information of those CSG cells that the UE is not allowed to access. In urban areas there can be numerous CSG cells, which can have a severe adverse effect on battery life. Furthermore, setting the IFRI "correctly" is difficult. If the typical setting of the IFRI is "disallowed" it may very frequently cause a UE to reselect to other frequencies or RATs. If the typical setting of IFRI is "allowed", the UE can remain on the frequency and read system information of CSG cells, causing a significant battery drain.

A modification of the above IFRI solution is considered in 3GPP document R4-082384, where it is proposed to signal a differential path-loss threshold from the CSG cell along with the IFRI. A UE computes the difference in measured path-loss between the macro cell and the CSG cell, and if the difference is higher than the signaled path-loss threshold, the UE obeys the IFRI from the CSG cell. Since such a threshold would have to be signaled by the CSG cell in a system information message, this method also requires the UE to read system information of those CSG cells that the UE is not allowed to access.

The various aspects, features and advantages of the disclosure will become more fully apparent to those with ordinary skill in the art, on careful consideration of the following Detailed Description and the accompanying drawings. The drawings have been simplified for clarity and are not necessarily drawn to scale.

DETAILED DESCRIPTION

A method of managing reselections in the presence of Closed Subscriber Group (CSG) cells is proposed that ensures that UE battery life is not significantly adversely impacted when reducing unnecessary reselection in the UE.

Figure 1:
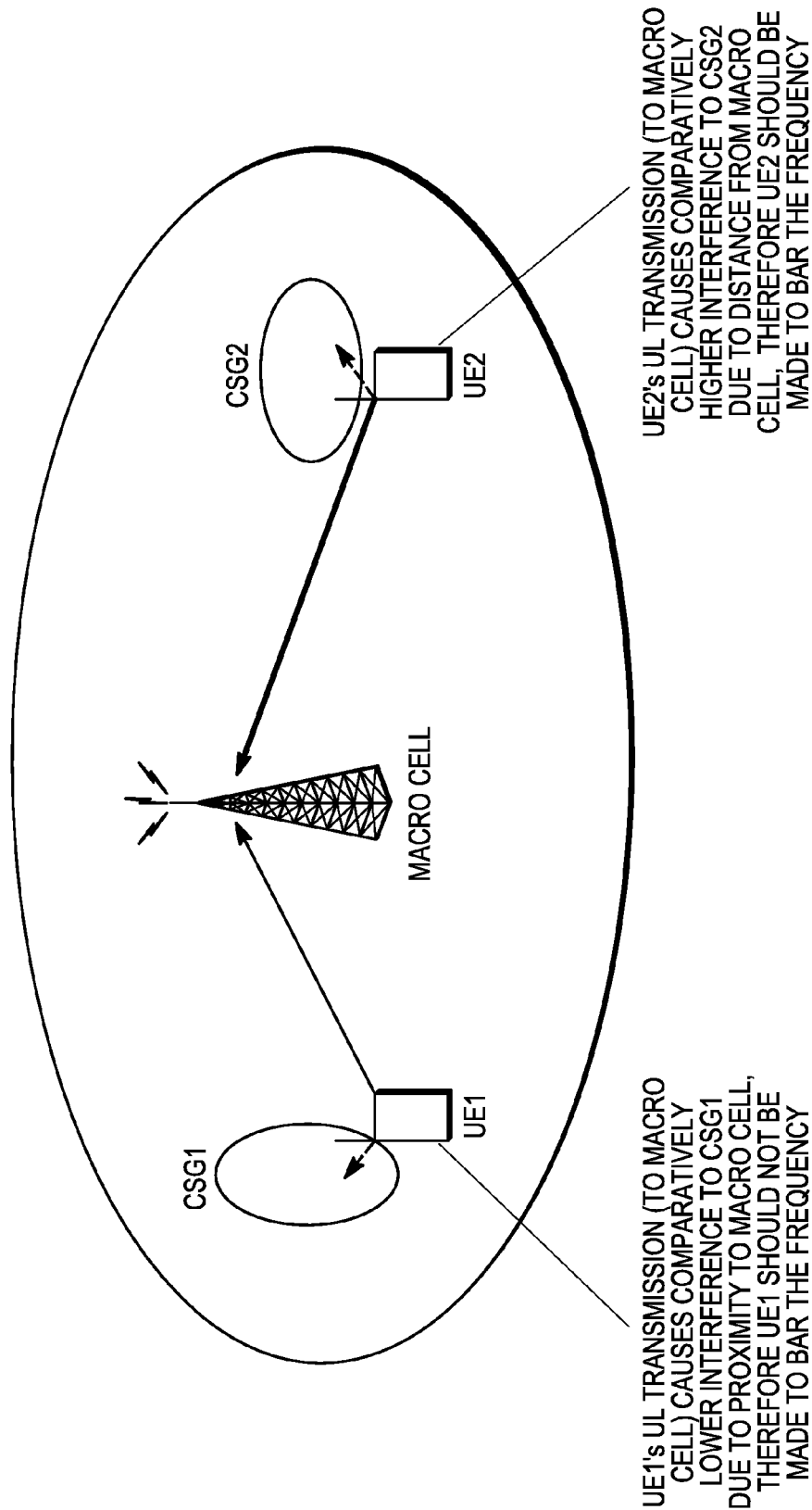
FIG. 1 illustrates the impact of UL interference to CSG cells.

The impact of the UL interference from macro cell UEs on a CSG cell is shown in FIG. 1. The interference caused to the CSG cell by a UE that is at the edge of the macro cell is likely to be more severe than the interference caused by a UE that is close to the macro cell.

According to a first embodiment, the macro cell broadcasts a path-loss threshold. If a UE's measured path loss from the macro cell is larger than the threshold: when the UE encounters a CSG cell that it is not allowed to access and ranks it as the highest, the UE bars the frequency (and attempts to reselect to a different frequency or RAT). If a UE's measured path loss from the macro cell is smaller than or equal to the threshold: when the UE encounters a CSG cell that it is not allowed to access and ranks it as the highest, the UE ignores the CSG cell (does not read its system information) and remains on the frequency.

Path-loss can be defined as the difference between the transmit power of the macro cell minus the receive signal power measured by the UE of the signal transmitted by the macro cell, as is well known by those having ordinary skill in the art. More specifically the measured quantity to determine the receive signal power can be the Reference Symbol Receive Power (RSRP). Path-loss can also be defined as the difference between the receive signal power measured by the UE of the signal transmitted by the CSG cell and the receive signal power measured by the UE of the signal transmitted by the macro cell.

In a first embodiment, the UE minimizes the reading of system information of CSG cells that the UE is not allowed to access. According to this embodiment, the UE reads system information of only those CSG cells to which the UE may have access based on the physical layer cell identifier. However, the UE may still perform some unnecessary reselections. For example, a macro cell UE may reselect upon encountering a CSG cell it cannot access even though there is no CSG UE in the CSG cell which would be impacted by any interference from the macro cell UE. Therefore additional control is provided in a second embodiment by combining the first embodiment with the use of the IFRI mechanism as follows:

The macro cell broadcasts a path-loss threshold.

CSG cells broadcast an IFRI.

If a UE's measured path loss from the macro cell is larger than the threshold: when the UE encounters a CSG cell that it is not allowed to access and ranks it as the highest, the UE obeys the IFRI. That is, If the IFRI is set to "disallowed" the UE bars the frequency (and attempts reselection to a different frequency or RAT).

If the IFRI is set to "allowed" the UE remains on the frequency upon reselecting to the second best ranked cell.

If the UE's measured path loss from the macro cell is smaller than or equal to the threshold: when the UE encounters a CSG cell that it is not allowed to access and ranks it as the highest, the UE ignores the CSG cell (i.e., the UE does not rank the CSG cell and does not read the CSG cell system information) and the UE remains on the frequency.

Figure 2:
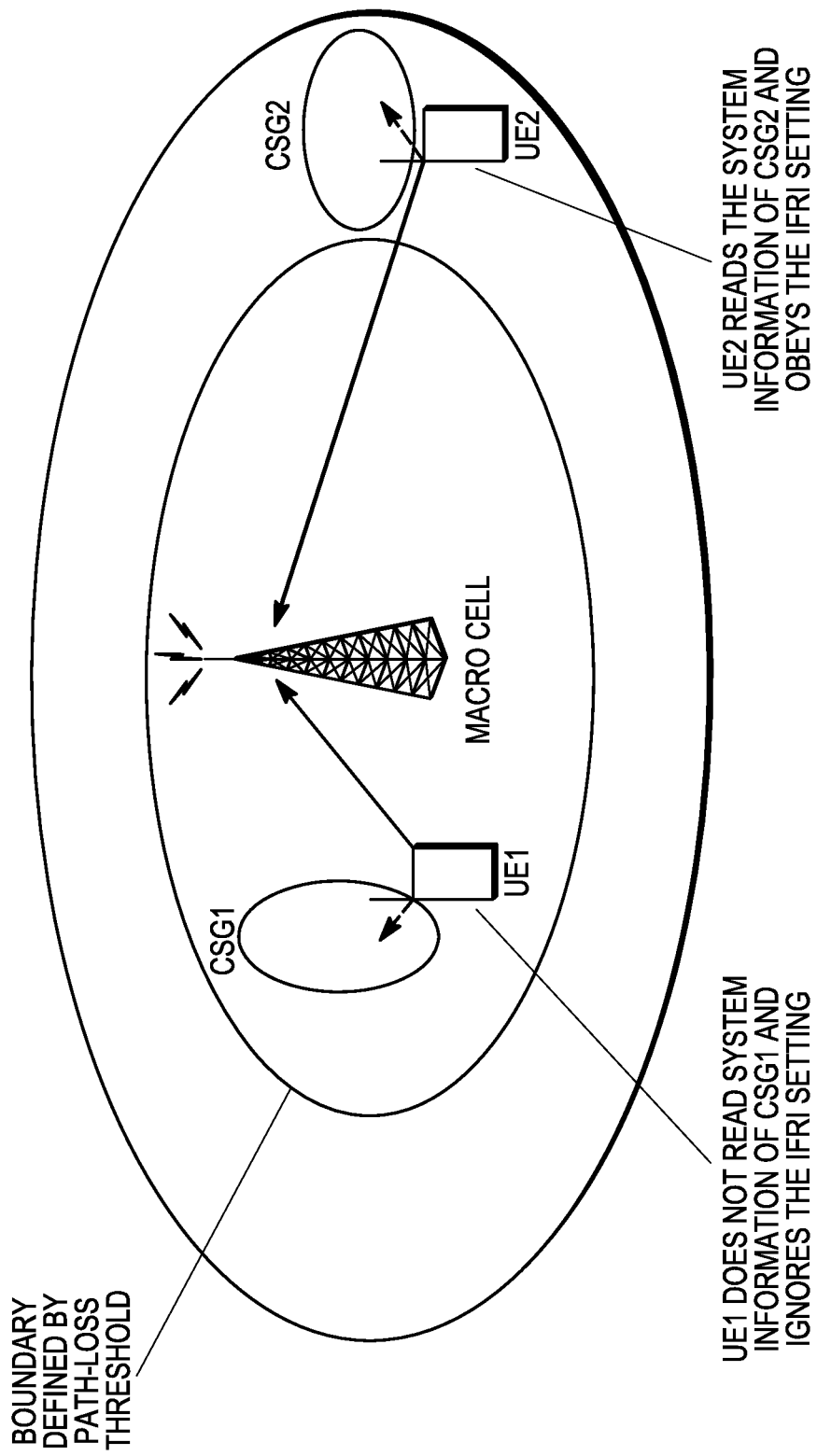
FIG. 2 illustrates a second embodiment.

FIG. 2 illustrates a second embodiment.

While the measured path-loss is larger than the path-loss threshold, the UE may encounter several CSG cells with the IFRI bit set to "allowed" causing the UE to remain on the frequency and continue to read system information of CSG cells. It may not be necessary for the UE to read the system information of every CSG cell that is encountered. The following observations regarding the interference caused apply:

The interference caused by a macro cell UE to a CSG cell is only limited to a short duration (at most a few hundred milliseconds). Once the macro eNB obtains measurement reports from the UE, the UE can be handed over to a different frequency or RAT.

A UE that is moving may not benefit from reading the IFRI of an encountered CSG cell because the UE may remain in idle mode and not have any UL transmissions while in interfering range of the CSG cell.

Thus we propose the following timer based mechanism to minimize the UE's reading of system information from CSG cells:

CSG cells that set IFRI to "allowed" also broadcast a timer value T seconds.

A UE that ranks as highest a CSG cell with IFRI set to "allowed" does not check the IFRI of any CSG cell for T seconds.

While the present disclosure and the best modes thereof have been described in a manner establishing possession by the inventors and enabling those of ordinary skill to make and use the same, it will be understood and appreciated that there are equivalents to the exemplary embodiments disclosed herein and that modifications and variations may be made thereto without departing from the scope and spirit of the invention, which is to be limited not by the exemplary embodiments but by the appended claims.

What is claimed is:

1. A mobile station for avoiding interference to restricted access cells, the mobile station comprising:
    a wireless transceiver,
    the mobile station configured to detect presence of a restricted access cell and to determine that the mobile station is not allowed to access the restricted access cell; and
    the mobile station configured to determine that a measured path-loss of a serving cell signal is larger than a path-loss threshold and
    to bar a carrier frequency on which the restricted access cell is deployed when the measured path-loss is larger than the path-loss threshold and when the mobile station is not allowed access to the restricted access cell;
    wherein the mobile station is further configured to:
    receive from the restricted access cell an indication that intra-frequency reselection is not allowed, and
    bar the carrier frequency on which the restricted access cell is deployed when all of the following conditions are satisfied:
        the measured path-loss is larger than the path-loss threshold,
        the mobile station is not allowed access to the restricted access cell, and
        an indication that intra-frequency reselection is not allowed is received.

2. The mobile station according to claim 1, wherein the mobile station is configured to receive the path-loss threshold from a serving cell.

3. The mobile station according to claim 1 wherein the mobile station is further configured to:
    determine that the measured path-loss of the serving cell signal is not larger than the path-loss threshold, and
    continue to operate on a carrier frequency on which the restricted access cell is deployed when the measured path-loss is not larger than the path-loss threshold.

4. The mobile station according to claim 1, wherein the mobile station is further configured to determine the measured path-loss based on a signal from a serving cell, wherein the serving cell and the restricted access cell share the carrier frequency.

5. The mobile station according to claim 1, wherein the mobile station is further configured to:
    receive from the restricted access cell an indication that intra-frequency reselection is allowed, and
    operate on the carrier frequency on which the restricted access cell is deployed when any one of the following conditions is satisfied:
        the measured path-loss is not larger than the path-loss threshold,
        the mobile station is allowed access to the restricted access cell,
        an indication that intra-frequency reselection is allowed is received.

6. The mobile station according to claim 1, wherein the mobile station is further configured to determine the measured path-loss, wherein the measured path-loss is a transmit power of the serving cell signal minus a received power of the serving cell signal.

7. A method in a wireless communication device comprising:
- receiving, at the wireless communication device, at least a path-loss threshold;
- measuring path-loss from a serving base station;
- determining whether the wireless communication device is allowed to access a restricted access cell detected by the wireless communication device;
- reselecting to a different frequency or radio access technology in response to determining that the wireless communication device is not allowed to access the restricted access cell and that the measured path-loss from the serving base station is equal to or greater than the path-loss threshold;
- receiving from the restricted access cell an indication of whether intra-frequency reselection is allowed; and
- determining that the wireless communication device is required to reselect to a different frequency or radio access technology in response to determining that the wireless communication device is not allowed to access the restricted access cell, that the measured path-loss from the serving base station is equal to or greater than the path-loss threshold, and receiving an indication from the restricted access cell that intra-frequency reselection is not allowed.

8. The method according to claim 7, further comprising determining that the wireless communication device is not required to reselect to a different frequency or radio access technology in response to determining that the wireless communication device is not allowed to access the restricted access cell and that the measured path-loss from the serving base station is less than the path-loss threshold.

9. The method according to claim 7 determining that the wireless communication device is not required to reselect to a different frequency or radio access technology in response to determining that the wireless communication device is not allowed to access the restricted access cell and that the measured path-loss from the serving base station is equal to or greater than the path-loss threshold, and receiving an indication from the restricted access cell that intra-frequency reselection is allowed.

* * * * *